United States Patent [19]
De Boer

[11] Patent Number: 5,927,039
[45] Date of Patent: Jul. 27, 1999

[54] WINDOW FIN CORNER PIECE

[75] Inventor: Gregory D. De Boer, Pella, Iowa

[73] Assignee: Pella Corporation, Pella, Iowa

[21] Appl. No.: 09/056,417

[22] Filed: Apr. 7, 1998

[51] Int. Cl.[6] .................................................. E04C 2/38
[52] U.S. Cl. ...................... 52/656.9; 52/656.1; 52/656.2;
52/211; 403/402; 49/504
[58] Field of Search ............................. 52/656.9, 656.1,
52/213, 211, 204.1, 202, 656.2; 49/505,
504, 501, 463, 171; 403/402, 293, 295,
305, 401

[56] References Cited

U.S. PATENT DOCUMENTS

| | | |
|---|---|---|
| 3,103,710 | 9/1963 | Fredericksen ............................. 72/211 |
| 3,214,873 | 11/1965 | Davis . |
| 3,874,142 | 4/1975 | Dallen .................................... 52/656.9 |
| 4,228,630 | 10/1980 | Englert et al. ...................... 52/204.1 X |
| 4,250,680 | 2/1981 | Bomar . |
| 4,453,855 | 6/1984 | Richter et al. . |
| 4,462,186 | 7/1984 | Fuller ...................................... 49/463 |
| 4,608,800 | 9/1986 | Fredette ............................... 52/211 X |
| 4,841,696 | 6/1989 | Miller . |
| 4,924,631 | 5/1990 | Davies et al. . |
| 4,989,381 | 2/1991 | De Block et al. . |
| 5,022,204 | 6/1991 | Anderson ............................. 49/504 X |
| 5,218,799 | 6/1993 | Appino ...................................... 52/213 |
| 5,433,054 | 7/1995 | Langenhorst .......................... 52/656.9 |
| 5,547,011 | 8/1996 | Dotson et al. ...................... 403/402 X |
| 5,572,834 | 11/1996 | Lilly ..................................... 52/211 X |

*Primary Examiner*—Carl D. Friedman
*Assistant Examiner*—Yvonne Horton-Richardson
*Attorney, Agent, or Firm*—Hovey, Williams, Timmons & Collins

[57] ABSTRACT

A fenestration product such as a window (10) includes frame members (20,22,24,26) with a joint (38,40) therebetween defining a corner, mounting fins (32,34,36) extending from the frame members (20,22,24,26) with gaps (42,44) therebetween, and sealing pieces (28,30) adhered to the fins (32,34,36) on opposed sides of the gaps (42,44) in spanning relationship therewith. A covering portion (58) of a respective sealing piece extends onto and adheres to the frame members on opposed sides of the joint thereby providing a positive seal at the window corner.

11 Claims, 2 Drawing Sheets

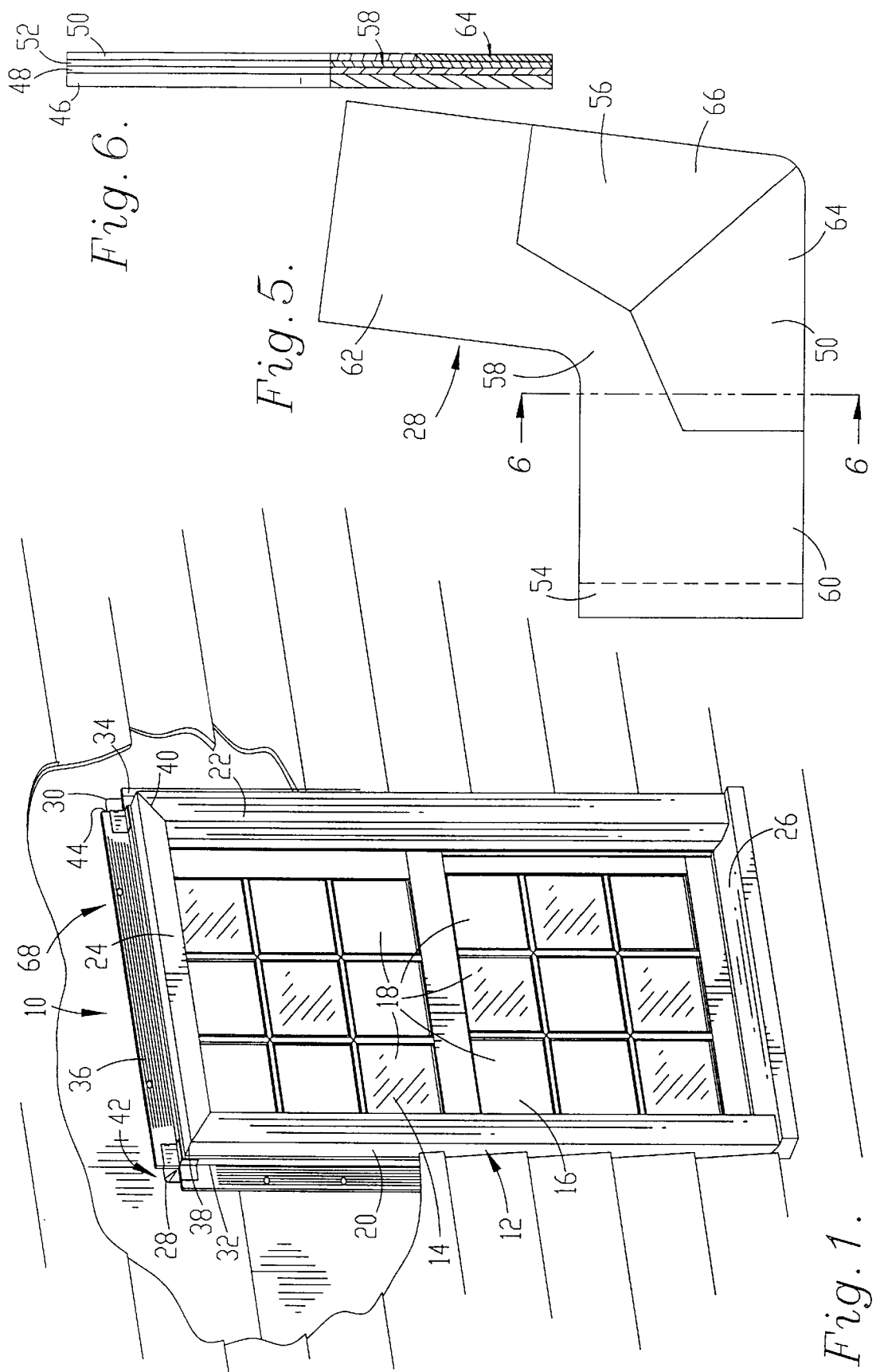

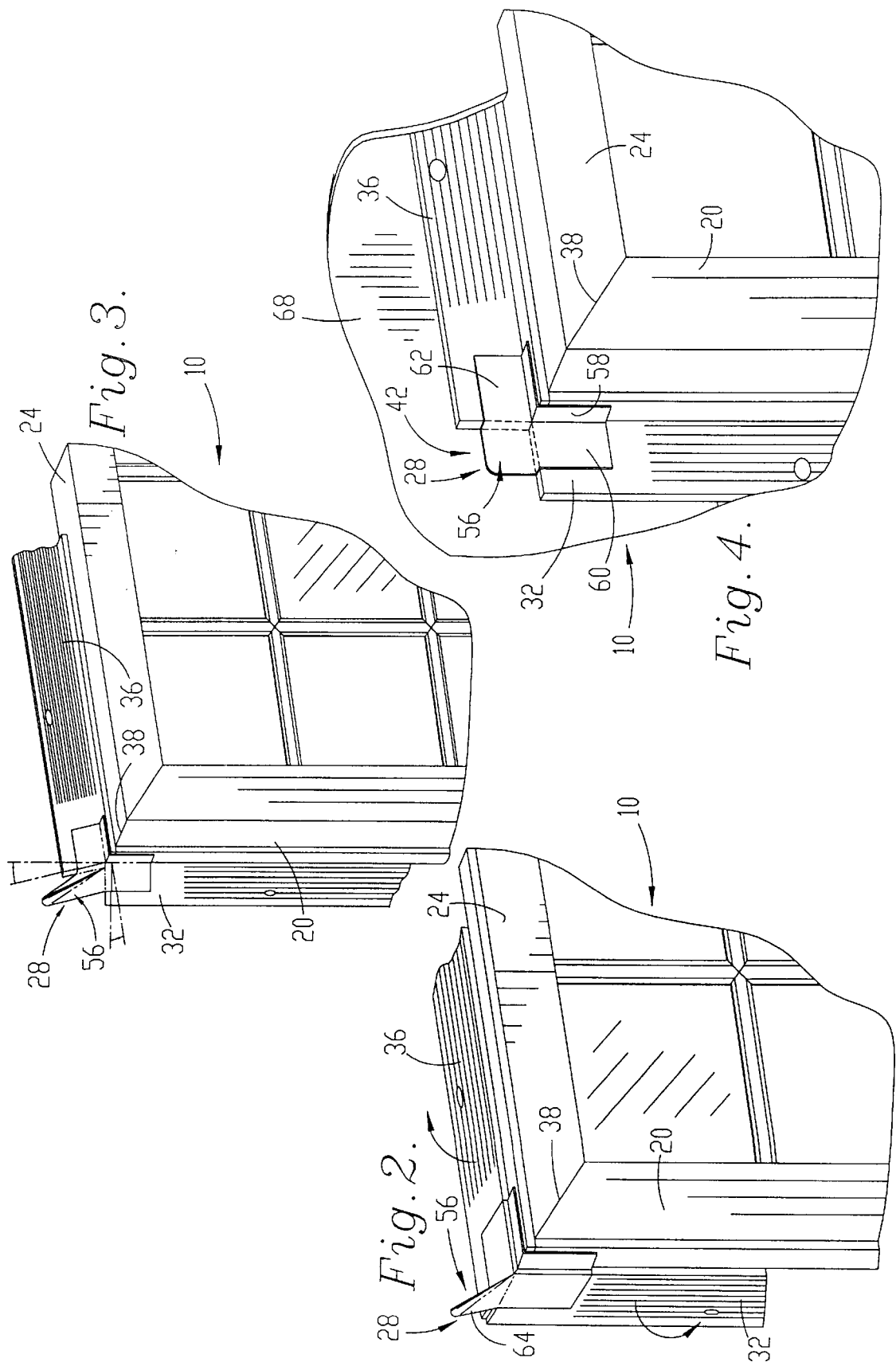

WINDOW FIN CORNER PIECE

RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION

1. Field of the Invention

The present invention relates to the field of fenestration products such as windows and doors. In particular, the invention is concerned with a fenestration product having a sealing piece adhered to the mounting fins on opposed sides of the gap in spanning relationship therewith and adhered to the adjacent frame members on opposed sides of the joint therebetween.

2. Description of the Prior Art

Fenestration products such as residential windows include a surrounding frame with mounting fins extending therefrom. The fins are nailed to the framing surrounding a rough opening in order to mount the window. Adjacent fins present a gap therebetween which can allow infiltration of air and water.

One prior art solution has been to adhere custom-cut foam pieces to the gaps between adjacent fins. This solution has only been partially successful because a gap still remains between the inboard edge of the foam piece and the corner of the window. Additionally, such foam pieces are shipped uninstalled to the final corner location, often resulting in loss or damage. As a result, additional foam pieces must be cut or ordered adding to the time and expense for properly installing the product.

SUMMARY OF THE INVENTION

The present invention solves the prior art problems discussed above and provides a distinct advance in the state of the art. More particularly, the window fin corner piece hereof provides an effective means to seal the periphery about a fenestration product in a manner that is economical and reliable.

The preferred fenestration apparatus includes a pane-surrounding frame made up of frame members with each having an outwardly extending mounting fin. A flexible sealing piece is attached to adjacent fins on opposed sides of the gap in spanning relationship therewith. The sealing piece further includes a cover portion extending onto and attached to adjacent frame members on opposed sides of the joint therebetween.

In preferred forms, the sealing pieces are attached to the mounting fins and folded against the frame members before shipment to the job site. The sealing pieces include adhesive for attachment to the fins and frame members and a removable release liner covering the adhesive in the area of the gap between fins. At the job site, the fins are shifted to the extended position generally transverse to the frame members and the release liner removed. Upon placement of the product in the rough opening, the adhesive coating attaches to the framing of the opening. Other preferred aspects of the present invention are disclosed herein.

BRIEF DESCRIPTION OF THE DRAWINGS

FIG. 1 is a pictorial view of the preferred fenestration apparatus in accordance with the present invention in the nature of a window shown mounted to a building and with portions cut away for illustrating the corners of the apparatus;

FIG. 2 is a partial pictorial view illustrating one corner of the apparatus of FIG. 1 with adjacent mounting fins and sealing piece in the folded position;

FIG. 3 is a view similar to FIG. 2 but showing the fins and sealing piece shifting toward the extended position;

FIG. 4 is a view similar to FIG. 3 showing the fins and sealing piece in the extended position;

FIG. 5 is a plan view of the preferred sealing piece of FIG. 1; and

FIG. 6 is a view taken along line 6—6 of FIG. 5.

DETAILED DESCRIPTION OF THE PREFERRED EMBODIMENT

FIG. 1 illustrates the preferred fenestration apparatus in the nature of window 10 in accordance with the present invention. Window 10 includes frame 12 surrounding and supporting upper and lower sashes 14 and 16 each having respective panes 18.

Frame 12 includes a plurality of frame members, specifically left and right jambs 20 and 22, head 24 and sill 26, and further includes a plurality of sealing pieces, one at each corner, such as pieces 28 and 30 illustrated for the upper corners. Frame members 20–26 each include a mounting fin extending therefrom such as mounting fin 32 extending from jamb 20, mounting fin 34 extending from jamb 22 and fin 36 extending from head 24.

Adjacent frame members such as jamb 20 and head 24 present joint 38 therebetween, and jamb 22 and head 24 present joint 40 therebetween. Fins 32 and 36 present gap 42 therebetween adjacent joint 38. Similarly, fins 36 and 34 present gap 44 therebetween adjacent joint 40. As illustrated in FIG. 1, sealing piece 28 attaches to fins 32 and 36 in spanning relationship with gap 42 and further attaches to jamb 20 and head 24 in covering relationship with joint 38. In a like manner, sealing piece 30 attaches to fins 34 and 36 in spanning relationship with gap 44 and further attaches to head 24 and jamb 22 in covering relationship with joint 40.

FIGS. 5 and 6 illustrate the preferred sealing piece such as piece 28. Piece 28 includes foam body 46, backing 48, release liner 50, and coating 52 of pressure sensitive adhesive between backing 48 and liner 50. Foam body 46 is preferably medium density PVC (such as Avery foam, type 4088) about 62 mils thick with backing 48 attached thereto as reinforcement and composed of high density polyethylene (such as Ultra Plate V) with the thickness of about 3 mils. Coating 52 (such as N-86 rubber based, pressure sensitive adhesive) is about 1.5 mils thick and positioned on the side of backing 48 opposite foam body 46. Liner 50 is preferably composed of 54#, silicone-coated paper, is positioned over coating 52, and further includes extended tab 54 for use in removing liner 50.

Piece 28 presents gap-spanning portion 56, covering portion 58 (adjacent to portion 56) on the inboard side thereof, and end portions 60 and 62. As illustrated in FIG. 5, release liner 50 is die cut in region of spanning portion 56 into liner sections 64 and 66.

In the preferred method, the sealing pieces of the present invention are installed at the manufacturing facility. Initially, for example, fins 32 and 36 are flat against jamb 20 and head 24, pointing to the interior of window 10. Liner 50 is removed by grasping and pulling on tab 54; liner sections 64 and 66 remain in place.

Coating 52 on end portion 60 is then placed against the exterior face of fin 32 adjacent gap 42 and onto jamb 20 adjacent joint 38. Similarly, coating 52 on end portion 62 is placed against the exterior face of fin 36 adjacent gap 42 and onto head 24 on the other side of joint 38. This places spanning portion 56 of sealing piece 28 in spanning relationship with gap 42, and positions covering portion 58 in a covering and sealing relationship with joint 38. Sealing piece 30 is likewise positioned relative to gap 44 and joint 40 as are other sealing pieces for the lower corners of window 10.

With the sealing pieces in position, window 10 is ready for shipment. As illustrated in FIG. 2, spanning portion 56 is folded and protrudes between fins 32 and 36 with liner sections 64, 66 remaining in place to protect adhesive coating 52 during shipment.

With window 10 at the job site and ready to be installed, the fins of window 10 are rotated to the extended position as illustrated in FIGS. 3 and 4. Window 10 is then placed in the rough opening for the window defined by framing 68. With window 10 in position, the mounting fins are nailed to frame 68. During this process, liner sections 64 and 66 are removed and adhesive coating 52 on spanning portion 56 pressed into contact with framing 68 in the gap between adjacent fins, such as gap 42 as illustrated in FIG. 4.

As will be appreciated, the sealing pieces completely seal the corners of window 10 against air and water infiltration. That is, spanning portion 56 closes the gap between adjacent fins and covering portion 58 extends onto the adjacent joint between frame members. In the prior art, sealing this area has required caulking for an effective seal. Moreover, this is accomplished with minimal labor on the job site and without the risk of the sealing pieces being lost in transit. Additionally, the preferred foam body 46 allows the sealing piece to conform to irregularities in the contact surfaces and backing 48 ensures structural strength.

As those skilled in the art will appreciate, the present invention encompasses many variations in the preferred embodiment described herein. For example, the invention finds utility with irregularly shaped windows and also doors. Also, other materials can be used for the preferred sealing piece.

Having thus described the preferred embodiment of the present invention, the following is claimed as new and desired to be secured by Letters Patent:

1. A fenestration apparatus comprising:
   a pane; and
   a frame surrounding said pane;
   said frame including
      a pair of adjacent frame members having a joint therebetween,
      a pair of mounting fins extending respectively from said frame members, said fins presenting a gap therebetween adjacent said joint, and
      a flexible sealing piece attached to said fin on opposed sides of said gap in spanning and sealing relationship therewith,
      said sealing piece including a cover portion extending onto and attached to said frame members on opposed sides of said joint in covering and sealing relationship therewith,
      said fins being shiftable between a folded position in which said fins are positioned adjacent said frame members and an extended position in which said fins are positioned generally transverse to said frame members.

2. The apparatus as set forth in claim 1, said fenestration apparatus including a window, adjacent ones of said frame members defining a corner therebetween.

3. The apparatus as set forth in claim 1, said sealing piece being composed of synthetic resin material.

4. The apparatus as set forth in claim 1, said sealing piece including a fin side and an opposed side and further including an adhesive coating on said fin side adhering said sealing piece to said fins and to said members.

5. The apparatus as set forth in claim 4, said sealing piece including a spanning portion spanning said gap between said fins and including a removable release liner covering said adhesive coating of said spanning portion.

6. The apparatus as set forth in claim 1, said sealing piece including a fin side and an opposed side and further including an adhesive coating on said fin side adhering said sealing piece to said fins and to said members, said fins being configured for attachment to the framing of a window opening when in said extended position said sealing piece including a spanning portion being configured for adhering to the framing of the window opening in order to provide a continuous seal around said frame relative to the framing.

7. The apparatus as set forth in claim 1, including a plurality of pairs of adjacent frame members and pairs of mounting fins and a corresponding plurality of said sealing pieces respectively attached thereto.

8. A method of handling a fenestration apparatus, said apparatus including a pane and a surrounding frame, said frame including a pair of adjacent frame members having a joint therebetween and a pair of mounting fins extending respectively from said frame members, said fins presenting a gap therebetween adjacent said joint, said method including the steps of:
   (a) before shipping said fenestration apparatus,
      attaching a sealing piece to said fins on opposed sides of said gap in spanning relationship therewith wherein said sealing piece includes a covering portion, and
      attaching said covering portion to said frame members on opposed sides of said joint, said sealing piece including a coating of adhesive on the fin side thereof in the area of said gap with a removable release liner covering said coating, said fins being folded adjacent said frame members;
   (b) before installing said fenestration apparatus in an opening defined by framing, shifting said fins to an extended position in which said fins are generally transverse to said frame members and removing said release liner; and
   (c) installing said fenestration apparatus by placing said frame within the opening, attaching said fins to the framing of the opening, and pressing said sealing piece against the framing so that said coating adheres the sealing piece in said gap to said framing.

9. The method as set forth in claim 8 including handling a window as said fenestration apparatus.

10. The method as set forth in claim 8, step (a) including the step of attaching said sealing piece composed of synthetic resin material.

11. The method as set forth in claim 8, said fenestration apparatus including a plurality of said gaps and joints, said method further including the step of attaching a corresponding plurality of said sealing pieces.

* * * * *